H. R. CHURCHILL.
VEHICLE VISOR.
APPLICATION FILED MAR. 18, 1921.
1,413,259.
Patented Apr. 18, 1922.
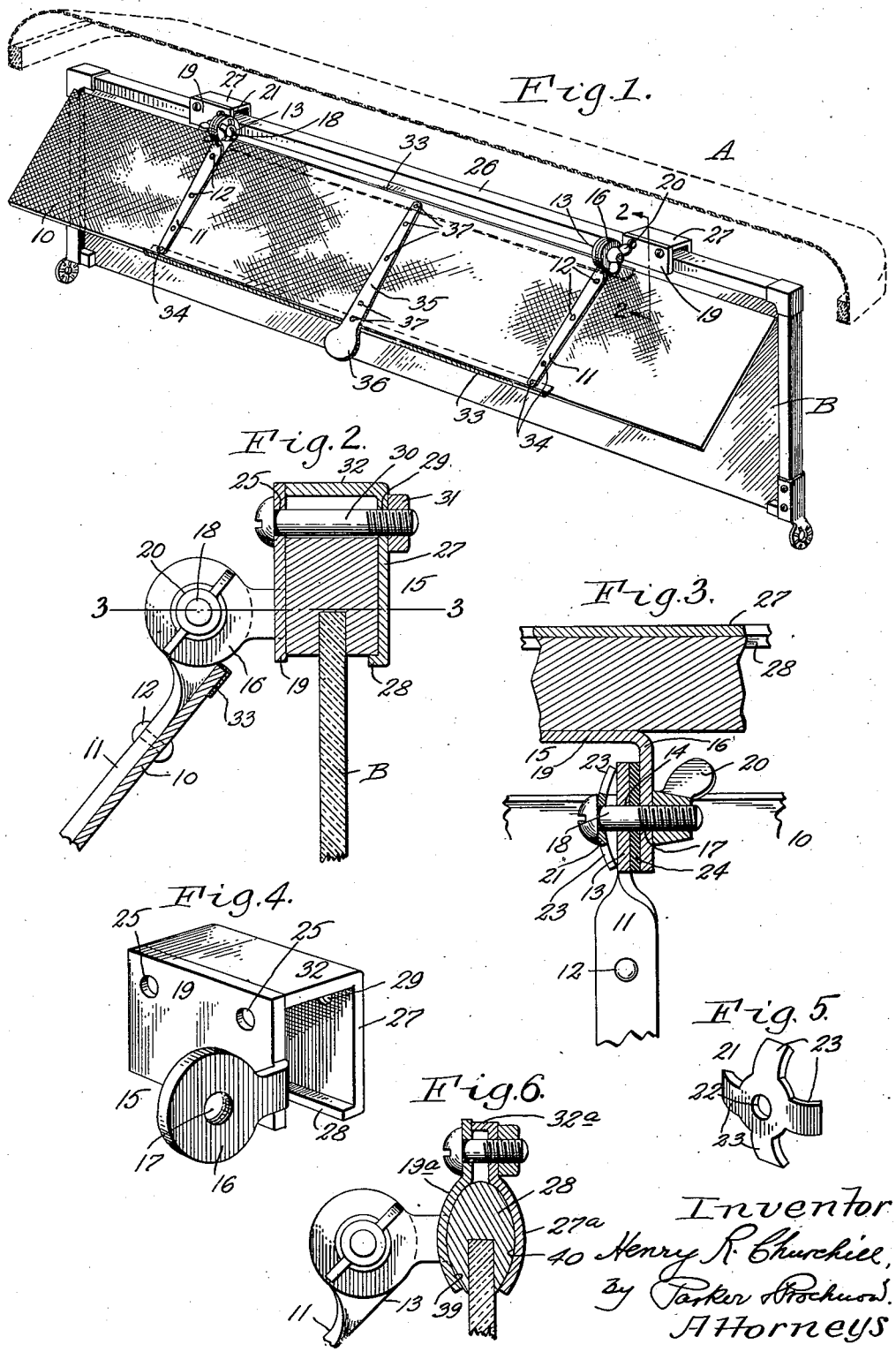

UNITED STATES PATENT OFFICE.

HENRY R. CHURCHILL, OF BUFFALO, NEW YORK.

VEHICLE VISOR.

1,413,259.  Specification of Letters Patent.  Patented Apr. 18, 1922.

Application filed March 18, 1921. Serial No. 453,263.

*To all whom it may concern:*

Be it known that I, HENRY R. CHURCHILL, a citizen of the United States, residing at Buffalo, in the county of Erie and State of New York, have invented a new and useful Improvement in Vehicle Visors, of which the following is a specification.

This invention relates to vehicle visors or screens adapted to shield the eyes of drivers or occupants of vehicles from the rays of the sun or lights on other vehicles or on the roadway.

Vehicle visors as heretofore provided have been positioned at the front or in advance of the windshields of the vehicles and in such position are almost wholly exposed to the weather. As a consequence of such positioning, the visors have necessarily been constructed of weather proof material and the connections between the visors and the windshields or parts of the vehicle have been treated to prevent them from rusting or deteriorating under the action of the elements with a consequent interference with ready operation, and owing to the very considerable air or wind pressure on the visor while the vehicle is in motion, the visors have heretofore, of necessity, been very heavy and rigid and the attachments most strong and rigid and expensive to provide. Again, with visors positioned in front of the windshields, the eyes of the driver or occupants of the vehicle are not shielded from glare caused by upwardly directed rays of light striking the windshield or glass behind the visor, such rays arising from lights close to the roadbed or from rays reflected from pools of water, wet streets and the like. Furthermore, in visors as heretofore constructed, it has been necessary to provide a number of types of visors of different sizes to fit vehicles or windshields of different widths and with the visors as heretofore constructed and positioned, considerable difficulty has been experienced in making adjustments of the visor, particularly in cars or vehicles of the enclosed type, as it has been necessary to adjust or position the visor from the outside of the vehicle.

The objects of the present invention are to provide a vehicle visor which may be supplied in a standard size and is readily adapted to be fitted to vehicle windshields or body frames of different widths; also to provide a relatively inexpensive vehicle visor; also to provide a visor which may be readily attached and adjusted from the interior of the vehicle; also to provide a visor which is so positioned as to be unaffected by the weather. Further objects are to provide improvements in vehicle visors and in attaching means therefor in the other respects set forth and claimed.

In the accompanying drawings:

Fig. 1 is a perspective view of a portion of a vehicle top and windshield equipped with a visor embodying the present invention.

Fig. 2 is a section thereof on an enlarged scale on line 2—2, Fig. 1.

Fig. 3 is a section thereof on line 3—3, Fig. 2.

Fig. 4 is a perspective view of the attaching clamp thereof.

Fig. 5 is a perspective view of the resilient bearing cap thereof.

Fig. 6 is a fragmentary sectional elevation showing a slightly modified form of clamp.

The invention, generally stated, comprises a visor or glare shield, which may be constructed of relatively light weight and inexpensive material and which is positioned within the vehicle, that is at the inner side of the windshield, together with means for readily attaching the visor to a windshield or part of the vehicle, and means for permitting a ready attachment and adjustment of the visor from inside the vehicle.

A designates a portion of a vehicle top and B a windshield glass or the like. According to the invention a visor or glare screen generally designated as 10, is provided, this visor being of some suitable opaque, light screening, or translucent material. In the preferred embodiment illustrated, the body of the visor consists of a panel of wall board or some suitable composite material which is inexpensive and light in weight, and which is readily divisible and which may be readily shaped and worked. As the visor or panel is positioned within the vehicle at the inner side of the windshield, it is not exposed to the weather and consequently there is no necessity of using any relatively expensive processes or resorting to any practices to make the visor weather proof. As the visor or shield is not exposed to the weather and is not subjected to violent wind pressure as is the case with visors positioned in front of or at the outer side of the windshield, the edges of the panel need not be bound or reinforced and the attaching devices by means of which the visor is connected to the vehicle may be of light weight and less sturdy and less expensive construction. The attaching devices are preferably spaced a distance from the ends of the panel, and by reason of such positioning of the attaching devices and by leaving the edges of the panel unbound, it is possible to supply the visors in a certain standard size which is readily adapted to fit vehicles of different sizes or windshields of different widths merely by cutting off or severing the ends of the panels to the extent necessary to properly fit the respective vehicles or windshields to which the visors are to be attached. If the panels are made of wall board or other light, composite readily divisible material, as preferred, they may be readily cut to the required size with a knife or other instrument, such operation requiring no special tools or skill.

The invention includes means for adjustably securing the visor to the vehicle or windshield so as to permit the visor to be adjusted to different positions to screen at different elevations. In the preferred form shown, 11 designates one or more transverse attaching strips or plates, suitably secured to the panel and permitting of a pivotal connection of the panel with a part of the vehicle or windshield frame. In the embodiment illustrated, a pair of these strips 11 is provided and the strips are secured to the panel by means of suitable rivets or the like 12. These attaching strips may be readily and inexpensively stamped from suitable metal.

In order to permit of a pivotal connection of the panel to a part of the vehicle or windshield frame, each attaching strip 11 is preferably provided with an ear or lug 13. It is considered preferable at this time to form this ear or lug from a portion of strip 11, as by twisting an end of the strip so as to extend in a plane at a right angle to the plane of the face of the strip. The ear or lug 13 is formed with a hole 14 to receive the bolt or pin upon which the lug pivots.

15 designates a bracket for attaching the visor to a part of the vehicle or windshield, this bracket comprising an ear or lug 16 adapted to be positioned substantially parallel to lug 13 and formed with a hole 17 to receive the pivotal bolt or pin 18. The bracket further comprises a plate or attaching portion 19 which is adapted to rest and be secured against a part of the vehicle or windshield. In the preferred form of the invention illustrated, bolt 18 is threaded into the hole 17 in lug 16 and 20 designates a locking nut threaded onto the end of bolt 18 to lock the bolt against disengagement from the threaded opening in lug 16. Other suitable pivotal connections may be used, if desired.

Means are provided for resiliently pressing lugs 13 and 16 toward each other so as to maintain the visor in the different positions to which it is adjusted. Any suitable resilient means for pressing these parts toward each other may be used, in the preferred embodiment a spring cap or disk 21 is provided. This cap is formed with a hole 22 adapted to receive the bolt 18 and is preferably provided with resilient projecting fingers 23. As best illustrated in Fig. 3, spring cap or disk 21 is adapted to rest on the bolt and bear against the under side of the head of the bolt, in which position the spring fingers 23 will be resiliently pressed against lug 13, thereby forcing the lug 13 toward lug 16 and holding and releasably maintaining the visor in the successive positions to which it is moved. When the lugs are constructed of certain metals or material, or if the opposing faces of the lugs be ribbed or scored, there will be sufficient friction between their opposing or contacting faces to insure that the spring cap or disk will effectively maintain the visor in the various adjusted positions to which it is moved. However, in certain cases, it has been found desirable to increase the binding action between these parts, and for this purpose a washer 24 composed of rubber or other suitable material may be inserted between the opposing faces of the lugs 13 and 16.

The plate portion 19 of the attaching bracket is provided with suitable screw or bolt receiving holes 25 and is adapted to be connected to a part of the vehicle or windshield frame.

For use in connection with vehicles having an upper windshield frame bar, as illustrated at 26, Fig. 1, the plate portion 19 of the bracket is adapted to cooperate with another clamping member or plate for detachably connecting the bracket to the windshield frame bar. In the preferred embodiment illustrated, this construction comprises a clamping member 27 adapted to rest against the outer side of the windshield frame bar 26 and provided with a lateral bead or flange 28 adapted to extend beneath the outer edge of the frame bar. Clamping member 27 is provided with bolt receiving holes 29 for receiving a bolt 30 which extends through one of the holes in plate 19, and 31 designates a nut for connecting the plate, the clamping part and the bolt, preventing their disengagement and by means of which the plate and clamping member may be tightly clamped upon the windshield frame bar. 32 designates a lateral spacing member, preferably formed integrally with the clamping part 27 and which bridges the frame bar 26 and bears against an edge of the plate 19 to maintain the upper edges of plate 19 and clamping member 27 spaced apart.

The panel of this invention is preferably reinforced throughout a portion of its length by means of one or more angle strips 33 of metal or suitable material which extends substantially between the attaching strips 11 and may be connected to these strips by rivets or the like as at 34. Each angle iron or strip preferably binds an edge of the panel to which it is attached, one side or leg of the strip resting on the outer face of the panel and the other leg resting upon the edge of the panel. As best illustrated in Fig. 1, it is preferred to provide a pair of these reinforcing strips, one at the upper edge and one at the lower edge of the panel. 35 designates a handle strip or plate substantially like transverse attaching strip 11, with the exception that its enlarged end portion is not bent or twisted out of the plane of its body portion as in the case of the attaching strips. The enlarged end of the handle strip forms a handle or finger tab 36. 37 designates suitable rivets or the like by means of which this handle plate may be secured to the reinforcing strips and to the panel.

In the slightly modified form of bracket and clamp illustrated in Fig. 6 of the drawings, which is adapted to permit of attachment of the devices to a windshield frame bar of the oval type designated as 38, the visor and the pivotal connections and bearings between the visor and the clamp are preferably the same as described with relation to the other figures of the drawing. In this modified form, the plate portion 19ª has a side concaved or shaped as at 39, to fit a side of the frame bar and the clamping portion 27ª is formed in a like manner as at 40 to fit the other side of the windshield frame bar. The other features of this modified clamp are substantially the same as the clamp heretofore described with the exception that the bridging or spacing portion 32ª is of substantially less length than in the form described above.

The visor of the present invention may be readily and easily attached to a part of the vehicle or windshield, if to the vehicle, by placing the plate portion 19 against the vehicle part and securing it thereto by means of screws or the like, and if to a windshield frame bar or part, by assembling the plate and clamping member on the bar and clamping them firmly thereon by means of the bolts and nuts provided for that purpose. In its operating position the visor may be readily adjusted from the interior of the vehicle and the visor or shield being relatively close to the driver, provides a more effective screen than if positioned in front of the windshield and screens the driver from the effects of any rays of light which strike the upper part of the windshield. If the windshield or vehicle front is opened, the visor serves to deflect air entering the vehicle and prevents wind and dust from blowing into the eyes and face of the driver.

In the description and in the appended claims, the term "windshield" is used as designating not only the usual swinging windshield but also permanent or semi-permanent windows or the like of an enclosed car or vehicle.

I claim as my invention:

1. In a vehicle visor, the combination of a panel of light-screening material having unbound ends, a pair of transverse attaching strips secured to said panel a distance from its ends, an adjustable connection between said attaching strips and a part of the vehicle, and an angle shape reinforcing strip resting on a portion of one side edge of said panel between said attaching devices.

2. In a vehicle visor, the combination of a panel of wall board, transverse attaching strips secured to said panel a distance from its ends, means cooperating with said attaching strips for connecting said panel to a part of the vehicle, a reinforcing strip along one side edge of said panel between said attaching strips, and a transverse handle strip secured to said panel and to said reinforcing strip.

HENRY R. CHURCHILL.